US009360557B1

(12) United States Patent
Miller et al.

(10) Patent No.: US 9,360,557 B1
(45) Date of Patent: Jun. 7, 2016

(54) SYSTEMS, METHODS, DEVICES AND SUBASSEMBLIES FOR RAPID-ACQUISITION ACCESS TO HIGH-PRECISION POSITIONING, NAVIGATION AND/OR TIMING SOLUTIONS

(71) Applicant: Apple Inc., Cupertino, CA (US)

(72) Inventors: Isaac T. Miller, San Mateo, CA (US); Clark E. Cohen, Washington, DC (US); Robert W. Brumley, San Mateo, CA (US); William J. Bencze, Half Moon Bay, CA (US); Brent M. Ledvina, San Francisco, CA (US); Thomas J. Holmes, Palo Alto, CA (US); Mark L. Psiaki, Brooktondale, NY (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 13/935,885

(22) Filed: Jul. 5, 2013

Related U.S. Application Data

(60) Provisional application No. 61/668,984, filed on Jul. 6, 2012, provisional application No. 61/691,661, filed on Aug. 21, 2012.

(51) Int. Cl.
*G01S 19/13* (2010.01)
(52) U.S. Cl.
CPC ........................................ *G01S 19/13* (2013.01)
(58) Field of Classification Search
CPC .................................. G01S 19/13; G01S 19/46
USPC ........................................ 342/357.51, 357.29
See application file for complete search history.

(56) References Cited

U.S. PATENT DOCUMENTS

| 5,450,329 A | 9/1995 | Tanner |
| 5,583,776 A | 12/1996 | Levi et al. |
| 5,812,961 A | 9/1998 | Enge et al. |

(Continued)

FOREIGN PATENT DOCUMENTS

KR          1020090087300          8/2009

OTHER PUBLICATIONS

International Search Report and Written Opinion in International Application No. PCT/US2015/022969, mailed Jun. 22, 2015, 12 pages.

(Continued)

*Primary Examiner* — Harry Liu
(74) *Attorney, Agent, or Firm* — Fish & Richardson P.C.

(57) ABSTRACT

Position, navigation and/or timing (PNT) solutions may be provided with levels of precision that have previously and conventionally been associated with carrier phase differential GPS (CDGPS) techniques that employ a fixed terrestrial reference station or with GPS PPP techniques that employ fixed terrestrial stations and corrections distribution networks of generally limited terrestrial coverage. Using techniques described herein, high-precision PNT solutions may be provided without resort to a generally proximate, terrestrial ground station having a fixed and precisely known position. Instead, techniques described herein utilize a carrier phase model and measurements from plural satellites (typically 4 or more) wherein at least one is a low earth orbiting (LEO) satellite. For an Iridium LEO solution, particular techniques are described that allow extraction of an Iridium carrier phase observables, notwithstanding TDMA gaps and random phase rotations and biases inherent in the transmitted signals.

4 Claims, 3 Drawing Sheets

(56) References Cited

U.S. PATENT DOCUMENTS

| | | | |
|---|---|---|---|
| 6,147,644 | A | 11/2000 | Castles et al. |
| 6,157,896 | A | 12/2000 | Castles et al. |
| 6,373,432 | B1 | 4/2002 | Rabinowitz |
| 6,417,801 | B1 | 7/2002 | van Diggelen |
| 6,606,346 | B2 | 8/2003 | Abraham et al. |
| 6,651,000 | B2 | 11/2003 | van Diggelen et al. |
| 6,704,651 | B2 | 3/2004 | van Diggelen |
| 6,937,187 | B2 | 8/2005 | van Diggelen et al. |
| 7,042,392 | B2 | 5/2006 | Whelan et al. |
| 7,158,080 | B2 | 1/2007 | van Diggelen |
| 7,372,400 | B2 | 5/2008 | Cohen et al. |
| 7,489,926 | B2 | 2/2009 | Whelan et al. |
| 7,554,481 | B2 | 6/2009 | Cohen et al. |
| 7,579,987 | B2 | 8/2009 | Cohen et al. |
| 7,732,400 | B2 | 6/2010 | Stern et al. |
| 7,978,130 | B1 | 7/2011 | Cohen et al. |
| 8,035,558 | B2 | 10/2011 | Cohen et al. |
| 2005/0156782 | A1 | 7/2005 | Whelan et al. |
| 2005/0159891 | A1 | 7/2005 | Cohen et al. |
| 2008/0001818 | A1 | 1/2008 | Cohen et al. |
| 2008/0059059 | A1 | 3/2008 | Cohen et al. |
| 2009/0091493 | A1 | 4/2009 | Hwang et al. |
| 2009/0182502 | A1 | 7/2009 | Riter et al. |
| 2011/0068973 | A1 | 3/2011 | Humphreys |
| 2011/0093202 | A1* | 4/2011 | Thompson ............... G01V 1/24 702/14 |
| 2011/0102259 | A1 | 5/2011 | Ledvina |
| 2011/0109506 | A1 | 5/2011 | Humphreys |
| 2011/0163913 | A1* | 7/2011 | Cohen ................... G01S 19/43 342/357.29 |
| 2011/0238307 | A1 | 9/2011 | Psiaki et al. |
| 2011/0238308 | A1 | 9/2011 | Miller |
| 2013/0176059 | A1 | 7/2013 | Brauner |
| 2015/0042511 | A1 | 2/2015 | Miller et al. |

OTHER PUBLICATIONS

Anonymous: "Examples of single frequency Cycle-Slip Detectors—Navipedia," (Mar. 22, 2013), Retrieved from the Internet: URL:http://www.navipedia.net/index.php/Examples_of_Single_frequency_Cycle-Slip_Detectors [retrieved on Jun. 15, 2015], 1 page.

Blewitt, "An automatic editing algorithm for GPS data," Geophysical Res Letters, 17(3):199-202 (Mar. 1, 1990).

Rodriguez et al., "Real-Time Detection of Ionospheric Scintillations and Potential Applications," GNSS 2008—Proceedings of $21^{st}$ Int'l Technical Meeting Satellite Div Institute Navigation, pp. 277-288 (Sep. 19, 2008).

Selected pp. 12-48; 125-127; 164-169; 218-219; 238-241; cover page; copyright page and table of contents from Misra, P., and Enge, P., The Global Positioning System: Signals, Measurements, and Performance Signal, Ganqa-Jamuna Press, Revised Second Edition, 2012.

Alonso, R., and Shuster, M.G., "Complete Linear Attitude-Independent Magnetometer Calibration," Journal of the Astronautical Sciences, vol. 50, No. 4, Oct.-Dec. 2002, pp. 477-490.

* cited by examiner

SYSTEMS, METHODS, DEVICES AND SUBASSEMBLIES FOR RAPID-ACQUISITION ACCESS TO HIGH-PRECISION POSITIONING, NAVIGATION AND/OR TIMING SOLUTIONS

CROSS-REFERENCE TO RELATED APPLICATION(S)

The present application claims priority of U.S. provisional applications 61/668,984, filed Jul. 6, 2012, and 61/691,661, filed Aug. 21, 2012, each entitled "Systems, Methods, Devices and Subassemblies for Rapid-Acquisition Access to High-Precision Positioning, Navigation and/or Timing Solutions." The entirety of each of the foregoing applications in incorporated by reference herein.

BACKGROUND

1. Field of the Invention

The present invention relates to high-precision position, navigation and/or timing (PNT) solutions based on signals received from overhead assets such as satellites and, in particular, to techniques suitable for providing rapid acquisition access to such PNT solutions without resort to a generally proximate, terrestrial ground station with fixed and precisely known position.

2. Description of the Related Art

Traditional precision satellite navigation techniques such as real time kinematic (RTK) and differential GPS (DGPS) techniques commonly used in surveying and high accuracy timing applications, depend on a terrestrial reference station in close proximity to the receiver to provide the receiver with measurements from satellites within view of both the terrestrial reference station and the receiver itself. The receiver commonly differences these reference station measurements (typically carrier phase measurements) with its own, and extracts extremely accurate and precise positioning and timing information from the differenced measurements. GPS-based precise point positioning (PPP) techniques employ a network of terrestrial reference stations to observe satellite orbits and, based thereon, broadcast corrections to receiver equipment via geosynchronous (GEO) satellites or a terrestrial communications network. In each case, centimeter-level in positioning solutions may be achieved. Unfortunately, RTK, DGPS and PPP techniques all require warm-up (convergence) times of about thirty (30) minutes to achieve high accuracy and/or integrity solutions. In addition, requirements for fixed terrestrial reference stations and/or coverage patterns of terrestrially-based, or geosynchronous overhead, correction distribution infrastructure can limit availability of conventional high-precision navigation techniques.

Improved techniques are desired.

SUMMARY

It has been discovered that position, navigation and/or timing (PNT) solutions may be provided with levels of precision that have previously and conventionally been associated with carrier phase differential GPS (CDGPS) techniques that employ a fixed terrestrial reference station or with GPS PPP techniques that employ fixed terrestrial stations and corrections distribution networks of generally limited terrestrial coverage. Using techniques described herein, high-precision PNT solutions may be provided without resort to a generally proximate, terrestrial ground station having a fixed and precisely known position. Instead, techniques described herein utilize a carrier phase model and measurements from plural satellites (typically 4 or more) wherein at least one is a low earth orbiting (LEO) satellite. For an Iridium LEO solution, particular techniques are described that allow extraction of an Iridium carrier phase observables, notwithstanding TDMA gaps and random phase rotations and biases inherent in the transmitted signals.

Receiver solution quality (at least for high precision solutions) can depend strongly on angular motion of a satellite across the sky, which for typically GNSS constellations such as the mid-Earth orbit (MEO) typical of GPS, GLONASS, Galileo and Compass (BeiDou-2) constellations, is quite slow. High quality solutions may require many tens of minutes. However, by including (e.g., modeling and measuring carrier phase for signals received from) at least one LEO satellite, high-quality, reference stationless solutions may be provided in a fraction of the time. Extraction of Iridium carrier phase observables presents particular challenges that can be addressed using techniques described herein. In addition, by eliminating the necessity of a fixed terrestrial reference station employed by conventional RTK or CDGPS systems and/or by untethering from GPS PPP correction distribution infrastructure of generally limited terrestrial coverage, the developed techniques can allow greater deployment flexibility.

Using the developed techniques, a receiver uses un-differenced carrier phase measurements directly to eliminate the need for a fixed terrestrial reference station. Instead, the receiver leans on the satellite as a space-based "reference station", effectively transferring the quality of the satellite's clock and knowledge of the satellite's orbit into its own solution. In typical MEO- and geosynchronous (GEO)-based satellite navigation, though, this technique would yield the undesirable property that the ambiguities in the satellite measurements could not be resolved in a practical amount of time to be useful, since the geometrical relationship between the receiver and the visible MEO/GEO satellites changes slowly over the course of several hours. However, by employing at least one low Earth orbit (LEO) satellite, rapid movement across the sky provides useful geometrical variation that allows ambiguities for all satellites (including any available MEO/GEO satellites) to be resolved with greatly reduced startup (convergence) time. For an exemplary LEO constellation of interest, namely the Iridium constellation, signal structure complexities have been addressed which allow extraction of useful carrier phase observables.

In some embodiments in accordance with the present invention, a method includes receiving at a navigation radio, signals transmitted from a first low earth orbit (LEO) satellite and computing therefrom first carrier phase measurements spanning first and second time epochs during a single overhead pass of the first LEO satellite; receiving at the navigation radio, signals transmitted from at least three additional satellites and computing therefrom respective carrier phase measurements including at least respective second, third and fourth carrier phase measurements; and computationally estimating parameters, including at least receiver position and time parameters, of a system of equations that model carrier phase for signals transmitted from the first LEO satellite at the first and second successive time epochs and for the least three additional satellites. The computing of carrier phase measurements spanning first and second time epochs during a single overhead pass of the first LEO satellite includes using motion constraints to patch temporal gaps in the received signals transmitted from the first LEO satellite and statistically estimating to substantially eliminate from the computed carrier phase measurements otherwise random phase rotations in the received signals transmitted from the first LEO satellite.

In some embodiments, none of the first, second, third or fourth carrier phase measurements used in the estimation or receiver position and time parameters is differenced from carrier phase measured at a fixed terrestrial reference station. In some embodiments, time elapsed between the first and second time epochs provides, from perspective of the receiver, at least about twenty degrees (20°) of angular travel by the first LEO satellite along the single overhead pass. In some embodiments, the at least three additional satellites are part of a medium earth orbit (MEO) constellation.

DESCRIPTION OF THE DRAWINGS

The present invention may be better understood, and its numerous objects, features, and advantages made apparent to those skilled in the art by referencing the accompanying drawings. Further details are provided in Appendix A, which forms an integral portion of the present disclosure.

Figure 1:
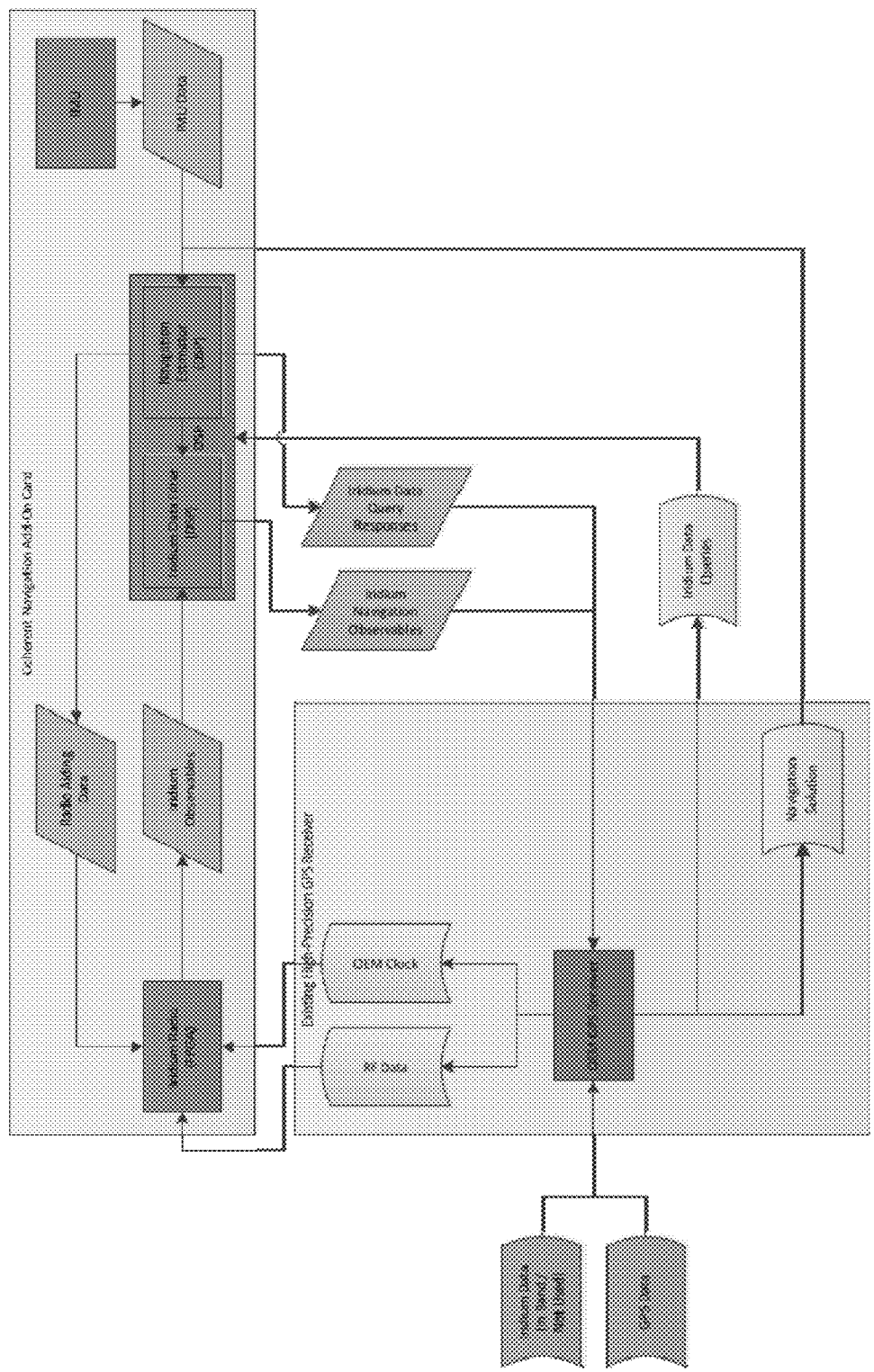
FIG. 1 is a functional block diagram of an exemplary embodiment in which an add-on card, circuit or other concrete implementation or component of an augmentation subsystem computes carrier phase observables from received Iridium LEO satellite signals for use in conjunction with a baseline high-precision GPS/GNSS system. The add-on implementation or component receives radio frequency (RF) data from the baseline high-precision GPS/GNSS system and current position, navigation and/or timing PNT solutions. The add-on implementation or component supplies the baseline high-precision GPS/GNSS system with computed Iridium carrier phase observables and is responsive to Iridium data queries from the baseline high-precision GPS/GNSS system. Data from an inertial measurement unit (IMU) and a current PNT solution from the baseline high-precision GPS/GNSS system are used, together with Iridium observables extracted from Iridium RF data, in a computational estimator to provide the supplied Iridium navigation observables and data query responses.

In the illustrated embodiment, GPS and Iridium RF data are received via combined RF front end. Although the exemplary embodiment of FIG. 1 is styled as an add-on implementation or component for use in connection with an otherwise largely conventional high-precision GPS receiver design, it will be appreciated by persons of skill in the art having benefit of the present disclosure that computational structures for Iridium observables extraction and estimation may be integrated with computational structures separately illustrated for the high-precision GPS receiver.

Figure 2:
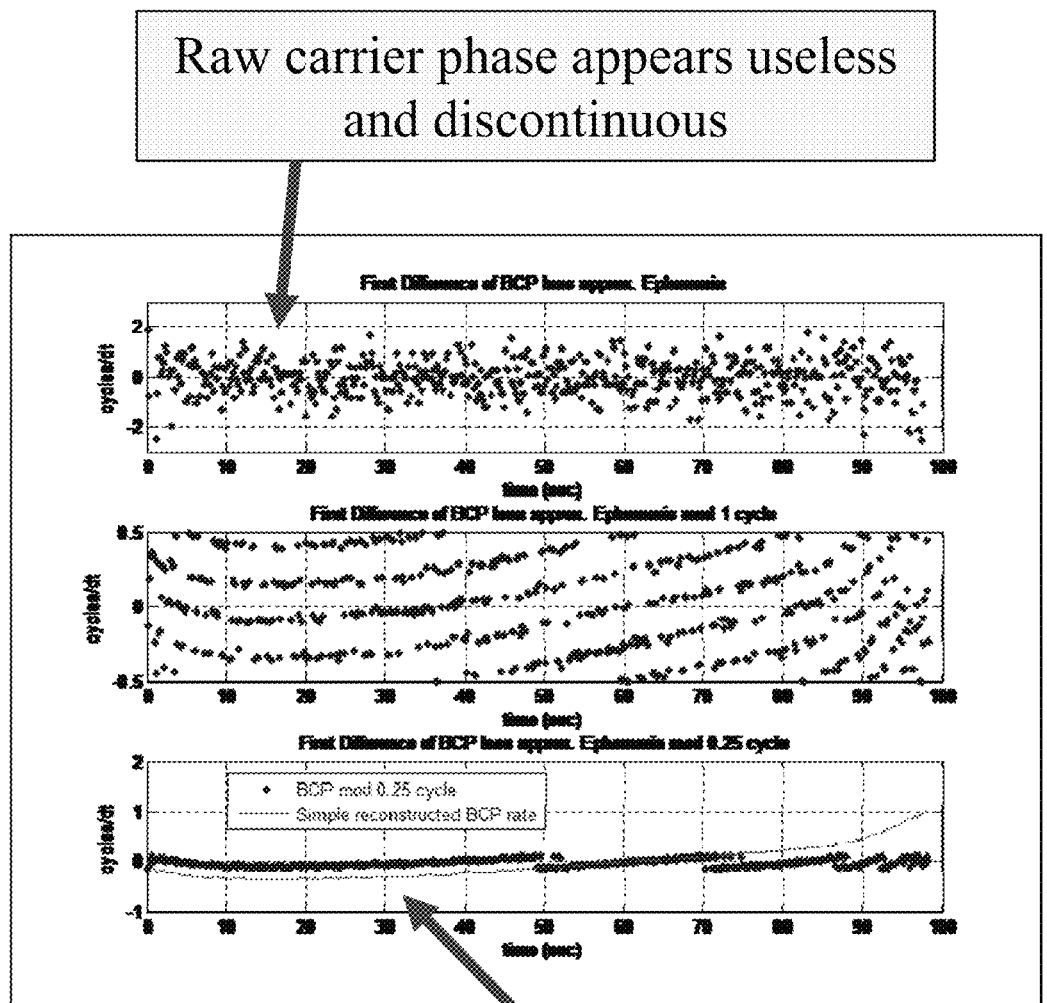

FIG. 2 is an illustration of results of a computational process by which usable Iridium carrier phase observables are extracted from raw carrier phase data. The computational process addresses significant challenges presented by the Iridium satellite signals themselves including the facts that (i) unlike GPS navigation signals, Iridium downlinks are time division multiplexed (TDMA) in character with signal transmission off most of the time, (ii) design details of the Iridium satellites introduce K random ninety degree (90°) phase rotations between downlink bursts and (iii) phased array antennas employed on Iridium satellites can present different carrier phase biases per beam or per antenna panel. Nonetheless, using techniques described in greater detail in an Algorithm Description included with Appendix A, useful carrier phase observables emerge when TDMA gaps in the received Iridium signals are computationally patched and random phase rotations and biases are computationally removed.

Figure 3:
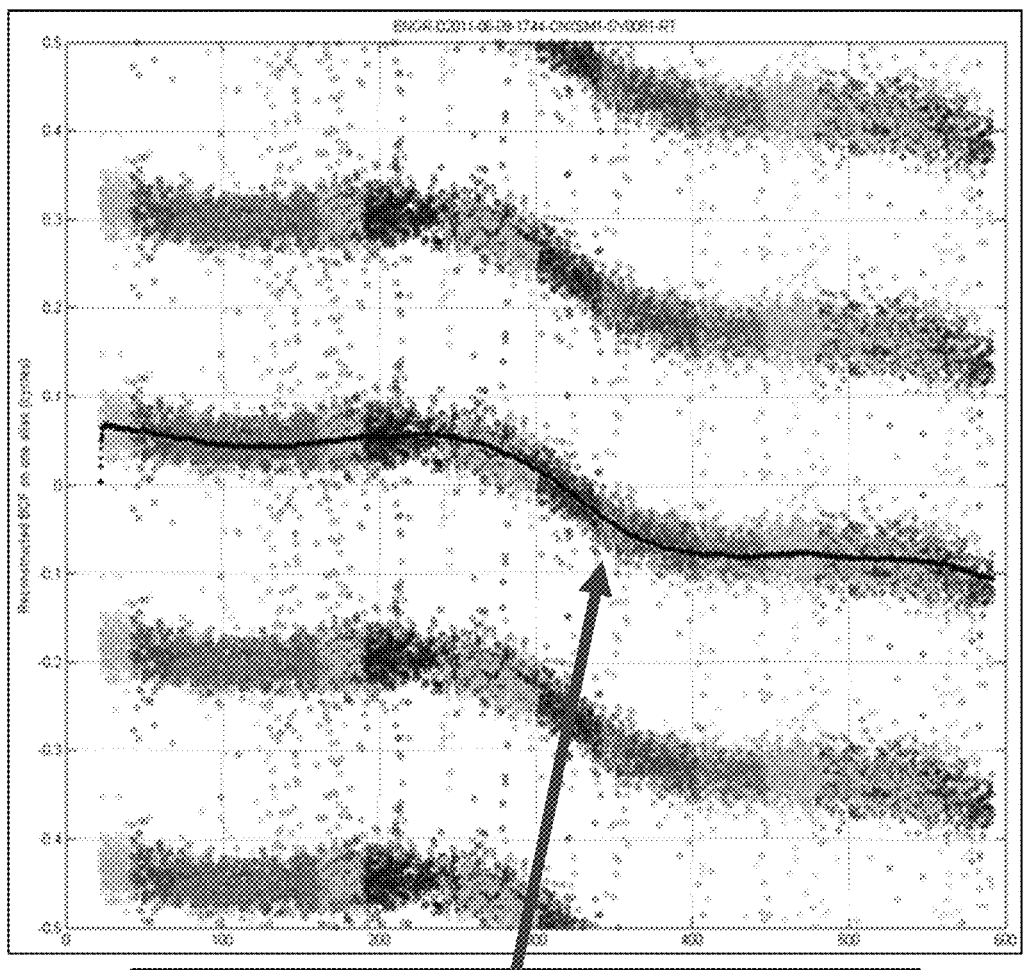

FIG. 3 is a more detailed illustration of results of a computational process by which usable Iridium carrier phase observables are extracted from raw carrier phase data. Specifically, an implementation or component of an augmentation subsystem such as illustrated with respect to FIG. 1 (or analgously integrated with computational structures of high-precision GPS/GNSS receiver) is used to compute useful carrier phase observables from received Iridium LEO satellite signals. IMU and clock data (or other motion constraints) are used to computationally patch up observables between gaps between TDMA downlink bursts. Statistical estimation is used to eliminate the aforementioned random phase rotations and biases between beams. Neighboring beams are also compared to patch up carrier phase discontinuities. More specifically, computational techniques that are described in greater detail in an Algorithm Description included with Appendix A, allow extraction of an Iridium carrier phase observable with accuracy of 4.6 mm RMS, notwithstanding the TDMA gaps and random phase rotations and biases previously described.

What is claimed is:

1. A method comprising:
   receiving at a navigation radio, signals transmitted from a first low earth orbit (LEO) satellite and computing therefrom first carrier phase measurements spanning first and second time epochs during a single overhead pass of the first LEO satellite;
   receiving at the navigation radio, signals transmitted from at least three additional satellites and computing therefrom respective carrier phase measurements including at least respective second, third and fourth carrier phase measurements; and
   computationally estimating parameters, including at least receiver position and time parameters, of a system of equations that model carrier phase for signals transmitted from the first LEO satellite at the first and second successive time epochs and for the at least three additional satellites,
   wherein the computing of carrier phase measurements spanning first and second time epochs during a single overhead pass of the first LEO satellite includes:
   using motion constraints to patch temporal gaps in the received signals transmitted from the first LEO satellite; and
   statistically estimating to substantially eliminate from the computed carrier phase measurements otherwise random phase rotations in the received signals transmitted from the first LEO satellite.

2. The method of claim 1,
   wherein none of the first, second, third or fourth carrier phase measurements used in the estimation or receiver position and time parameters is differenced from carrier phase measured at a fixed terrestrial reference station.

3. The method of claim 1,
   wherein time elapsed between the first and second time epochs provides, from perspective of the receiver, at least about 20 degrees of angular travel by the first LEO satellite along the single overhead pass.

4. The method of claim 1,
   wherein the at least three additional satellites are part of a medium earth orbit (MEO) constellation.

* * * * *